United States Patent
Scheele et al.

(10) Patent No.: US 8,834,660 B1
(45) Date of Patent: Sep. 16, 2014

(54) VISCO PAD PLACEMENT IN DISK DRIVES

(71) Applicant: Hutchinson Technology Incorporated, Hutchinson, MN (US)

(72) Inventors: Bryan J. Scheele, Hutchinson, MN (US); Neal T. Eidenschink, Wayzata, MN (US); John L. Schumann, Litchfield, MN (US); Trent A. Johnson, Hutchinson, MN (US); Daniel W. Scheele, Hutchinson, MN (US); Cameron T. Hempel, Hutchinson, MN (US); Scott J. Cray, Winsted, MN (US); Kenneth L. Bolster, Dassel, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/148,930

(22) Filed: Jan. 7, 2014

(51) Int. Cl.
| B29C 65/50 | (2006.01) |
| B32B 37/20 | (2006.01) |
| B32B 37/26 | (2006.01) |
| B32B 38/04 | (2006.01) |
| B32B 38/10 | (2006.01) |
| G11B 5/84 | (2006.01) |

(52) U.S. Cl.
CPC ........................................ *G11B 5/84* (2013.01)
USPC ............ 156/234; 156/248; 156/256; 156/261; 156/289

(58) Field of Classification Search
USPC ......... 156/230, 234, 247, 248, 250, 256, 261, 156/289
See application file for complete search history.

(56) References Cited

U.S. PATENT DOCUMENTS

| 3,582,575 | A | * | 6/1971 | Scofield ................. 191/29 DM |
| 3,862,522 | A | * | 1/1975 | Mednick .................... 451/532 |
| 3,877,120 | A | * | 4/1975 | Okamoto et al. .............. 28/115 |
| 3,910,339 | A | * | 10/1975 | Kramer ........................ 160/404 |
| 4,014,257 | A | * | 3/1977 | Bettenhausen ................ 101/26 |
| 4,181,554 | A | * | 1/1980 | Rich ............................ 156/261 |
| 4,916,798 | A | * | 4/1990 | Ballast .......................... 29/432 |
| 5,189,779 | A | * | 3/1993 | Fishel et al. ................... 29/453 |
| 5,212,847 | A | * | 5/1993 | Melcher et al. ............. 15/244.1 |
| 5,267,572 | A | * | 12/1993 | Bucalo .......................... 600/567 |
| 5,275,076 | A | * | 1/1994 | Greenwalt .................. 83/698.31 |
| 5,722,142 | A | * | 3/1998 | Myers ............................ 29/268 |
| 5,795,435 | A | * | 8/1998 | Waters, Jr. .................... 156/577 |
| 5,893,201 | A | * | 4/1999 | Myers ............................ 29/268 |
| 5,922,000 | A | * | 7/1999 | Chodorow .................... 606/167 |
| 6,029,334 | A | * | 2/2000 | Hartley .......................... 29/464 |
| 6,063,228 | A | * | 5/2000 | Sasaki et al. ................. 156/261 |
| 6,080,173 | A | * | 6/2000 | Williamson et al. .......... 606/184 |

(Continued)

OTHER PUBLICATIONS

3M Ultra_pure Viscoelastic Damping Polymer 242NR01, Technical Data, Mar. 2012, 4 pages.

*Primary Examiner* — Sing P Chan
(74) *Attorney, Agent, or Firm* — Faegre Baker Daniels LLP

(57) ABSTRACT

The present disclosure relates to methods and a related systems and tools for dispensing an adhesive piece having damping qualities onto a component of a hard disk drive suspension. The adhesive piece can be commercially available layered strip sold as an adhesive layer having a first and a second liner adhered to each side. An exemplary method can cut an adhesive piece, separate the adhesive piece from a secondary liner, adhere the adhesive piece onto a component of a hard disk drive suspension, separate a primary liner from the adhesive piece, and dispose of the primary liner using a conventional gantry system. The method can be performed using a two-step operation of the gantry system.

20 Claims, 11 Drawing Sheets

(56) References Cited

U.S. PATENT DOCUMENTS

| | | | |
|---|---|---|---|
| 6,085,456 A * | 7/2000 | Battaglia | 43/43.16 |
| 6,095,023 A * | 8/2000 | Harada et al. | 83/22 |
| 6,308,483 B1 * | 10/2001 | Romine | 52/410 |
| 6,380,483 B1 * | 4/2002 | Blake | 174/668 |
| 6,381,821 B1 * | 5/2002 | Panyon, Jr. | 29/33 R |
| 6,387,111 B1 * | 5/2002 | Barber | 606/184 |
| 6,581,262 B1 * | 6/2003 | Myers | 29/268 |
| 6,695,859 B1 * | 2/2004 | Golden et al. | 606/184 |
| 6,711,930 B2 * | 3/2004 | Thom et al. | 72/409.01 |
| 6,752,661 B2 * | 6/2004 | Gu et al. | 439/607.01 |
| 6,789,593 B1 * | 9/2004 | Aono et al. | 156/513 |
| 6,802,496 B1 * | 10/2004 | Preta | 256/65.04 |
| 6,870,091 B2 * | 3/2005 | Seidler | 174/382 |
| 7,185,409 B1 * | 3/2007 | Myers | 29/268 |
| 7,241,302 B2 * | 7/2007 | Sniffen et al. | 606/184 |
| 7,288,590 B2 * | 10/2007 | Lechat et al. | 524/575 |
| 7,322,999 B2 * | 1/2008 | Kanner et al. | 606/185 |
| 7,338,693 B2 * | 3/2008 | Shikano et al. | 428/40.1 |
| 7,438,718 B2 * | 10/2008 | Milliman et al. | 606/142 |
| 7,938,840 B2 * | 5/2011 | Golden et al. | 606/153 |
| 7,946,010 B1 * | 5/2011 | Myers et al. | 29/213.1 |
| 8,151,440 B2 * | 4/2012 | Tsutsumi et al. | 29/603.03 |
| 8,157,947 B2 * | 4/2012 | Kim | 156/261 |
| 8,741,195 B2 * | 6/2014 | Kurihara et al. | 264/154 |
| 2001/0001937 A1 * | 5/2001 | Benes et al. | 83/531 |
| 2002/0159845 A1 * | 10/2002 | Mikell | 405/302.6 |
| 2002/0168897 A1 * | 11/2002 | Chang | 439/607 |
| 2002/0178778 A1 * | 12/2002 | Thom et al. | 72/409.01 |
| 2003/0051890 A1 * | 3/2003 | Marshall | 173/206 |
| 2004/0007322 A1 * | 1/2004 | Lechat et al. | 156/289 |
| 2004/0032093 A1 * | 2/2004 | Razavi | 277/628 |
| 2004/0084198 A1 * | 5/2004 | Seidler | 174/35 R |
| 2004/0092971 A1 * | 5/2004 | Sniffin et al. | 606/151 |
| 2004/0092998 A1 * | 5/2004 | Sniffin et al. | 606/184 |
| 2004/0102797 A1 * | 5/2004 | Golden et al. | 606/153 |
| 2004/0199182 A1 * | 10/2004 | Milliman et al. | 606/139 |
| 2004/0225313 A1 * | 11/2004 | Kanner et al. | 606/184 |
| 2004/0250952 A1 * | 12/2004 | Lechat et al. | 156/289 |
| 2005/0010241 A1 * | 1/2005 | Milliman et al. | 606/153 |
| 2005/0060864 A1 * | 3/2005 | Nikolaidis et al. | 29/432 |
| 2005/0101983 A1 * | 5/2005 | Loshakove et al. | 606/185 |
| 2006/0248702 A1 * | 11/2006 | Nikolaidis et al. | 29/432 |
| 2007/0005072 A1 * | 1/2007 | Castillo et al. | 606/79 |
| 2007/0293884 A9 * | 12/2007 | Cole et al. | 606/187 |
| 2008/0071302 A1 * | 3/2008 | Castillo et al. | 606/167 |
| 2008/0124842 A1 * | 5/2008 | Wang et al. | 438/118 |
| 2008/0251201 A1 * | 10/2008 | Sikkel et al. | 156/330 |
| 2008/0264557 A1 * | 10/2008 | Kim | 156/251 |
| 2008/0272122 A1 * | 11/2008 | Son | 220/278 |
| 2009/0036904 A1 * | 2/2009 | Milliman et al. | 606/143 |
| 2009/0183359 A1 * | 7/2009 | Tsutsumi et al. | 29/603.07 |
| 2010/0208425 A1 * | 8/2010 | Rapisarda | 361/692 |
| 2011/0159767 A1 * | 6/2011 | Sakurai et al. | 442/320 |
| 2011/0299288 A1 * | 12/2011 | Rapisarda | 362/311.02 |
| 2012/0000376 A1 * | 1/2012 | Kurihara et al. | 100/39 |
| 2012/0180956 A1 * | 7/2012 | Kim | 156/515 |
| 2012/0248759 A1 * | 10/2012 | Feith | 285/39 |
| 2012/0276232 A1 * | 11/2012 | Marczyk et al. | 425/76 |
| 2012/0285306 A1 * | 11/2012 | Weibelt | 83/86 |
| 2013/0006281 A1 * | 1/2013 | Golden et al. | 606/153 |
| 2013/0055561 A1 * | 3/2013 | Tsutsumi et al. | 29/729 |

* cited by examiner

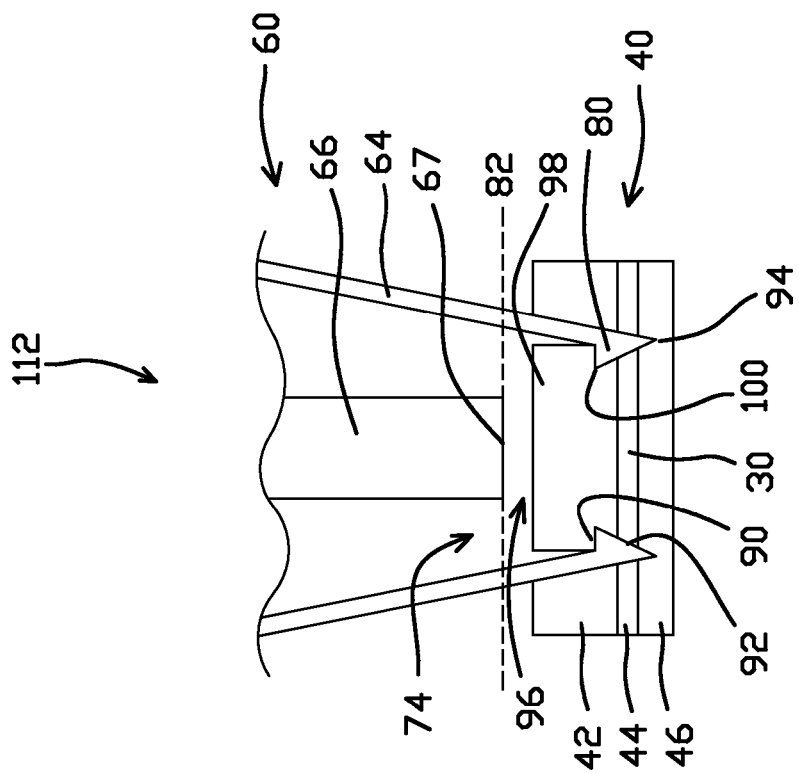
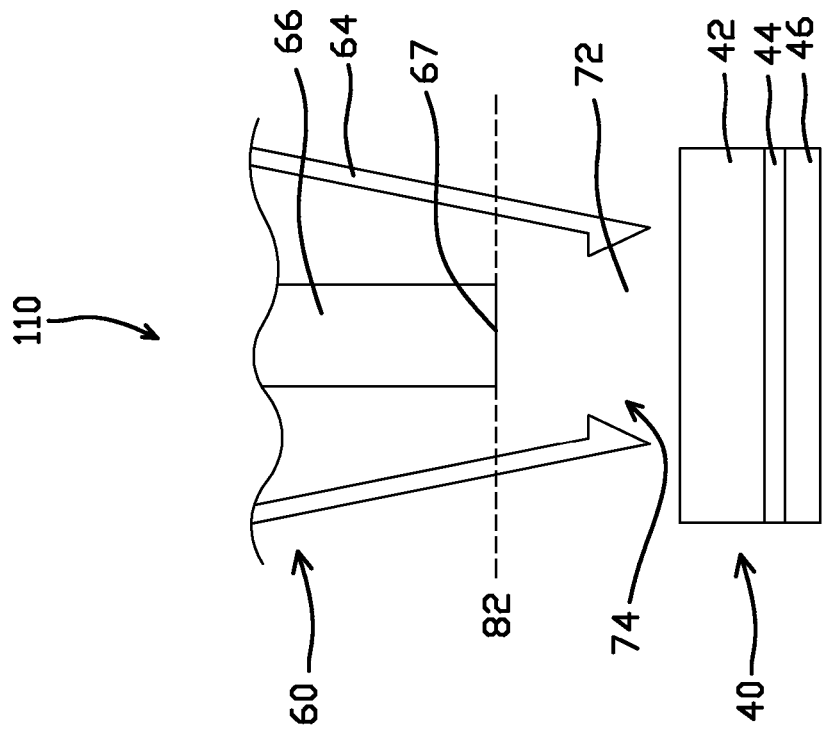

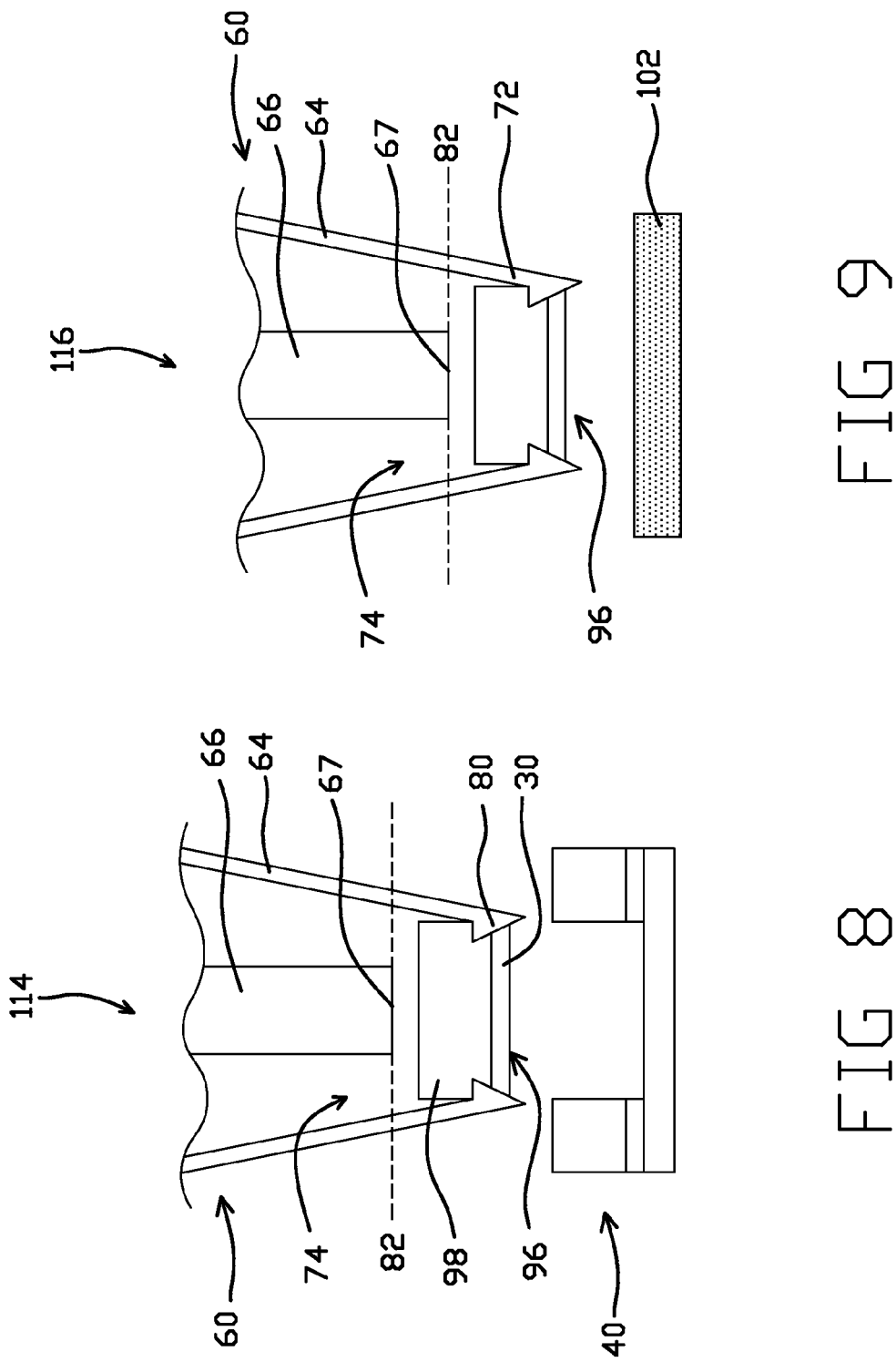

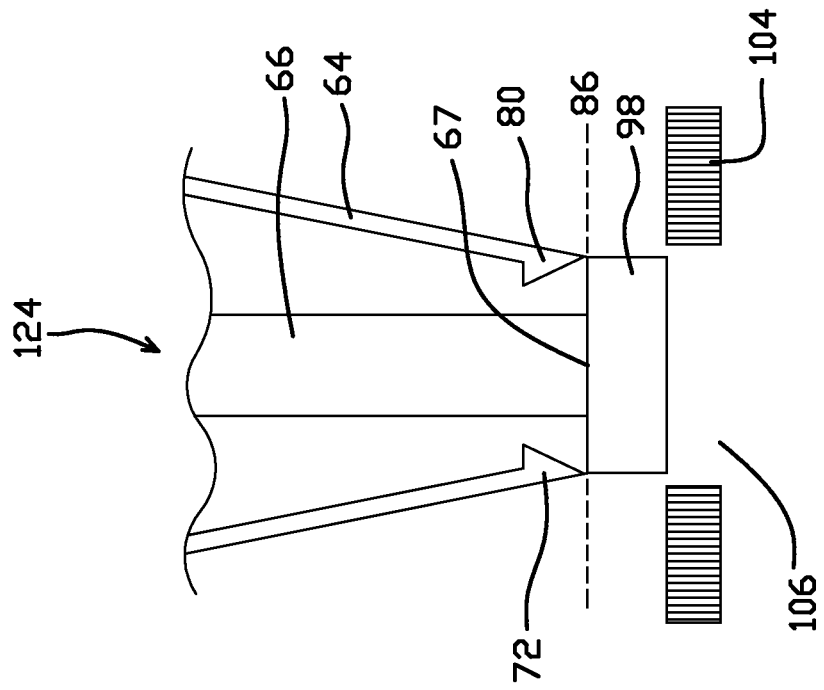
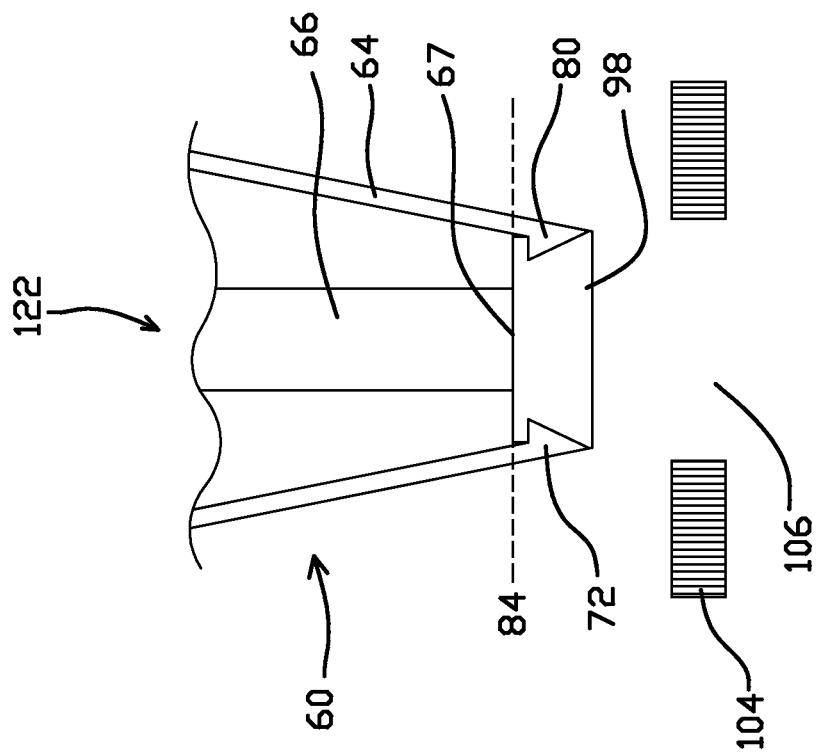

VISCO PAD PLACEMENT IN DISK DRIVES

TECHNICAL FIELD

The present disclosure relates to disk drives and suspensions for disk drives and other electronic components.

BACKGROUND

Dual stage actuation (DSA) disk drive head suspensions and disk drives incorporating DSA suspensions are generally known and commercially available. For example, DSA suspensions having an actuation structure on the baseplate or other mounting portion of the suspension, i.e., toward one end from the spring or hinge region of the suspension, are described in the U.S. Patent Publication No. 2010/0067151 to Okawara, U.S. Patent Publication No. 2012/0002329 to Shum, U.S. Patent Publication No. 2011/0242708 to Fuchino, and U.S. Pat. No. 5,764,444 to Imamura. DSA suspensions having actuation structures located on the loadbeam or gimbal portions of the suspension, i.e., toward another end from the spring or hinge region, are also known and disclosed, for example, in U.S. Pat. No. 5,657,188 to Jurgenson, U.S. Pat. No. 7,256,968 to Krinke, and U.S. Patent Publication No. 2008/0144225 to Yao. Co-located gimbal-based DSA suspensions are disclosed in co-pending U.S. Provisional Application No. 61/700,972. All of the above-identified patents and patent applications are incorporated herein by reference in their entirety for all purposes.

There remains a continuing need for improved DSA suspensions. DSA suspensions with enhanced performance capabilities are desired. The suspensions should be capable of being efficiently manufactured.

SUMMARY

The present disclosure relates to methods, systems, and apparatuses for dispensing an adhesive piece onto a component, such as a component of a hard disk drive suspension. Various embodiments can comprise a gantry system and a punch. The punch can be attached to the gantry system and have a proximal end, a distal tip, a barrel, and a lumen extending through the barrel, the barrel having an inner surface defining the lumen and an outer surface, the distal tip including a cutting edge.

A retention feature can be formed in the inner surface and disposed within the lumen at or near the distal tip. The cutting edge can be configured to cut through a layered adhesive strip having an adhesive layer and a liner adhered to the adhesive layer. The retention feature be configured to engage the liner during a cutting of the liner and the adhesive layer and retain at least partially a piece of the liner adhered to a piece of the adhesive layer within the lumen following a cutting of the liner and the adhesive layer.

A pressure pin can be disposed within the lumen and translatable within the lumen. The actuator can translate the pressure pin within the lumen to a first position, a second position, and a third position. The first position of the pressure pin allows the release liner to enter the lumen during the cutting of the release liner and the adhesive layer. Translation of the pressure pin from the first position to the second position adheres the adhesive piece to the component of the hard disk drive suspension while retaining the liner piece in the lumen. Translation of the pressure pin from the second position to the third position expels the liner piece from the lumen.

BRIEF DESCRIPTION OF THE DRAWINGS

FIG. 6 is a side view showing the tool 60 in a pre-cut position.

FIG. 7 is a side view showing the tool 60 in the post-cut position.

FIG. 8 is a side view showing the tool 60 in extraction position.

FIG. 9 is a side view showing the tool 60 in pre-placement position.

FIG. 12 is a side view showing the tool 60 in pre-disposal position.

FIG. 13 is a side view showing the tool 60 in disposal position.

DESCRIPTION OF THE INVENTION

DSA structures typically have components which move relative to each other. The capacity to move leaves the DSA structure, and the suspension as a whole, susceptible to unwanted vibration and other movement. Various embodiments of the present invention concern the placement of a dampening layer along a suspension, such as on the DSA structure. For example, a dampening layer can be placed on a component, such as a tongue, a motor, and/or other components of a DSA structure. Commercially-available dampers are often sold in strips having two-sided adhesive and liners on each side. Placing the damper onto the component requires cutting a piece of the strip for the damper, removing a bottom liner, adhering the damper to the component, and then removing the top liner. Placing the damper is often performed with a gantry system. Removing the top liner often requires a manual operation, another apparatus in addition to the gantry system, or a more complicated gantry system, which increases manufacturing time and cost. The present disclosure addresses placing an adhesive damper, from a commercially available strip, onto a component of a hard disk drive suspension with a conventional gantry system.

Figure 1:
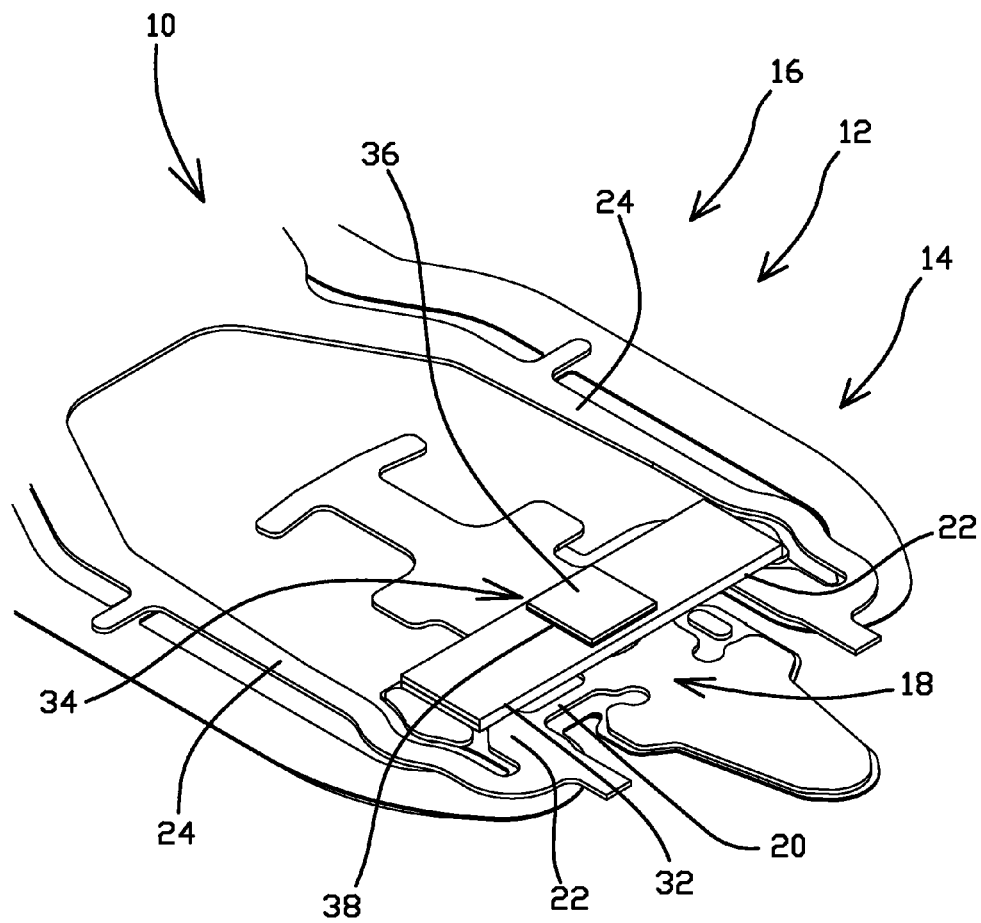
FIG. 1 is an isometric view of one end portion of a hard disk drive suspension.
Figure 2:
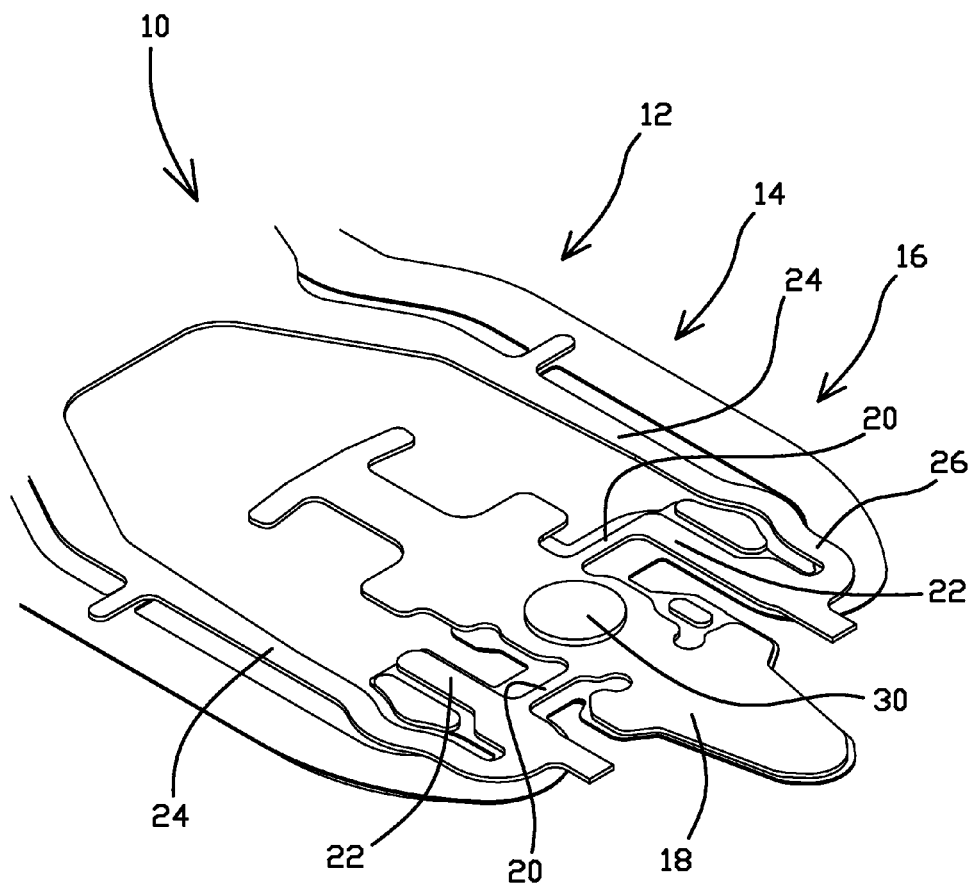
FIG. 2 is an isometric view of the end portion of FIG. 1 showing an adhesive piece placed on a component of the hard disk drive suspension according to various embodiments of the disclosure.

FIG. 1 is an isometric view of one end portion of a hard disk drive suspension 10 showing the stainless steel side of a flexure 12 having a gimbal 16 with a DSA structure 14. FIG. 2 is an isometric view of the end portion of FIG. 1 showing an adhesive piece 30 placed according to various embodiments of the disclosure.

As shown, the flexure 12 includes a gimbal 16 at an end of the flexure 12. A DSA structure 14 is located on the gimbal 16. The DSA structure 14 includes a motor 32, which is a lead zirconium titanate element (PZT) or other piezoelectric actuator in the illustrated embodiment, mounted to the gimbal 16 of the flexure 12. The lateral ends of a motor 32 can be attached to the support regions 22 of the spring arms 24. Layers of adhesive can be positioned on the support regions 22 of the spring arms 24. The motor 32 extends over the tongue 18. The motor 32 can be electrically activated to bend the struts 20 and move (e.g., rotate) the tongue 18 about a tracking axis.

As shown by the removal of the motor 32 in FIG. 2, an adhesive piece 30 is located on a top surface of the tongue 18. In this way, the adhesive piece 30 is located between the top surface of the tongue 18 and the bottom surface of the motor 32. It is noted that the top surface of the tongue 18 and the bottom surface of the motor 32 face each other. The adhesive piece 30 can be in contact with each of the top surface of the tongue 18 and the bottom surface of the motor 32. In various embodiments, the adhesive piece 30 can be adhered to the top surface of the tongue 18 and/or the bottom surface of the motor 32. The adhesive piece 30 can be in the form of a layer of material. The adhesive piece 30 can be formed from a viscoelastic adhesive material. In some embodiments, the material that forms the adhesive piece 30 is inherently adhesive. In some other embodiments, the adhesive piece 30 comprises a core non-adhesive material (e.g., a viscoelastic or elastic layer) and an adhesive material that is disposed on the top and/or bottom surface of the core non-adhesive material.

Relative motion occurs between the motor 32 and the tongue 18 during activation of the motor 32. The adhesive piece 30 acts as a damper to reduce or eliminate vibration and/or other types of unwanted motion such as out-of plane motion of the tongue 18 during high frequency resonance modes, thereby providing lower gain and higher servo bandwidth capabilities. In general, the greater the area directly between the motor 32 and the tongue 18 that is covered by adhesive piece 30, the greater the benefits and advantages such as those described above that can be achieved. Adhesive layers such as that described herein can also be incorporated into other DSA structures (not shown) in a similar configuration or other parts of a suspension.

Adhesive piece 30 can be formed as various shapes. In various embodiments, the adhesive piece 30 has an annular outer profile. As illustrated, the adhesive piece 30 is in the shape of a circle. The adhesive piece 30 has a cross-sectional area bound by the outer profile and a thickness. In various embodiments, the cross-sectional area is sized such that the motor 32 generally covers the adhesive piece 30 when viewing the suspension 10 from directly above the top surface of the motor 32. The thickness of the adhesive piece 30 depends on at least the type of suspension used, the conditions under which the suspension is being used, and the damping performance of the material used to form the adhesive piece 30. In various embodiments, the adhesive piece 30 has a thickness between 10-100 microns.

The adhesive piece 30 is formed of a resilient material. The resilient material can be an elastic material. Such resilient material can be a visco-elastic material. Visco-elastic materials can provide enhanced damping benefits. Examples of suitable materials include 3M™ 242 and JDC MP65 materials. These materials typically have a relatively low elastic modulus and therefore have low stiffness. In various embodiments, the adhesive piece 30 is extracted from a commercially available and inexpensive layered adhesive strip.

The motor 32 has a top surface opposite the bottom surface of the motor 32. As shown, an impingement element 34 can be mounted on the top surface of the motor 32. The illustrated impingement element 34 comprises multiple layers. Specifically, the impingement element comprises a top layer 36 which can comprise a layer of metal (e.g., stainless steel), plastic, or other material that is relatively hard to robustly engage a dimple of a loadbeam. The impingement element 34 includes a second layer 38 below the top layer 36. The second layer 38 can be adhered to the top layer 36 and the top surface of the motor 32. The second layer 38 can comprise an adhesive piece, which is similar to adhesive piece 30.

Figure 3:
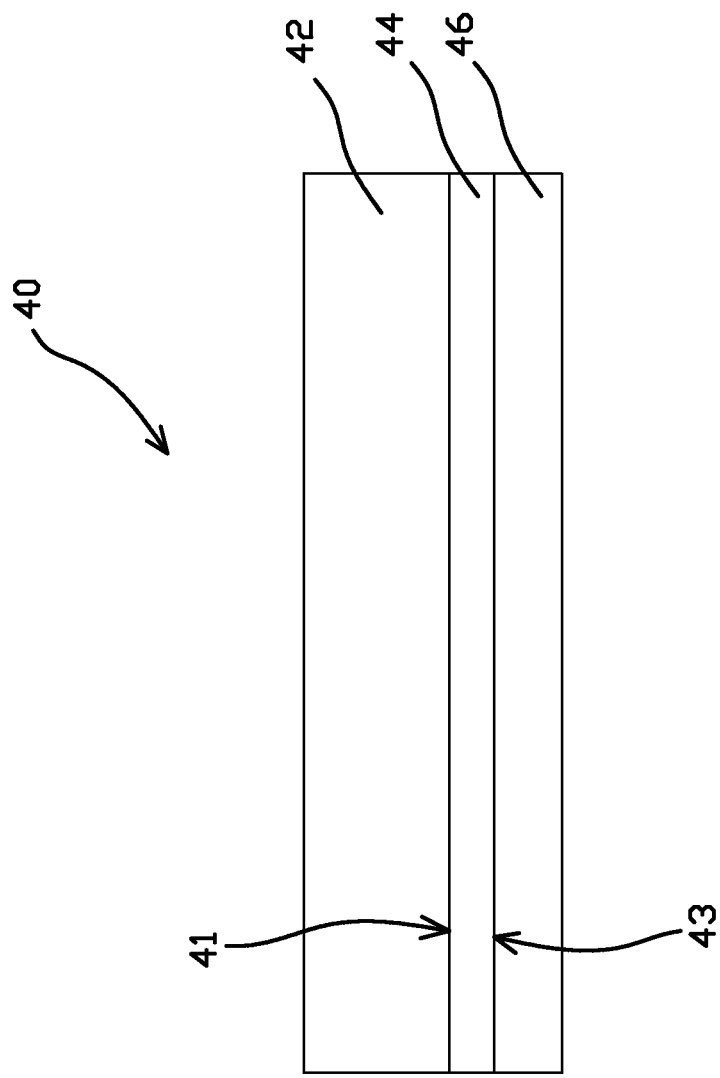
FIG. 3 is a schematic, cross-sectional side view of an exemplary layered adhesive strip from which an adhesive piece can be extracted.

FIG. 3 is a schematic, cross-sectional side view of an exemplary layered adhesive strip 40 from which the adhesive piece 30 can be extracted. Layered adhesive strip 40 is generally planar in the lateral direction and has an overall thickness. The layered adhesive strip 40 has layers, which can include a liner and/or an adhesive layer. In the illustrated embodiment, the layered adhesive strip 40 has a first liner (e.g., a primary liner or release liner) 42, an adhesive layer 44 having a first side 41 adhered onto the first liner, and a second liner 46 adhered onto a second side 43 of the adhesive layer. The liners 46, 42 and adhesive layer 44 each has a thickness contributing to the overall thickness of the layered adhesive strip 40. In various embodiments, the thickness of each layer can differ. In some embodiments, the thickness of the first liner is 4/1000 of an inch, the adhesive layer is 1/1000 of an inch, and the second liner is 2/1000 of an inch. As such, the first liner can be thicker than the second liner.

The first liner 42 is releasably adhered to the adhesive layer 44 and is formed of a first material, such as polyethylene. The second liner 46 is releasably adhered to the adhesive layer 44 and is formed of a second material, such as polyester. The first liner 42 and adhesive layer 44 can be resiliently compressible in the lateral direction. The second liner 46 may further include a coating made of a third material. The adhesive layer 44 can be adhered to the first and second liners 42, 46 by a suitable adhesive, such as an acrylic polymer. Because the adhesive layer 44 is adhered to different materials of the first liner 42 and the second liner 46, the adhesion force or peel strength when removing each liner 42, 46 from the adhesive layer 44 differs. In various embodiments, a first adhesion force between the first liner 42 and the adhesive layer 44 is greater than a second adhesion force between the adhesive layer 44 and second liner 46. Specifically, the layered adhesive strip 40 can be a commercially available product, such as 3M™ Ultra-Pure Visco elastic Damping Polymer 242NR01, which exhibits such differential adhesion strengths for opposing liners that sandwich an intermediate adhesive layer. In some embodiments, the first liner 42 and the second liner 46 may be formed from the same type of material. In such cases, the first liner 42 and the second liner 46 may be processed differently such that they have different relative strengths of adhesion to the adhesive layer 44 (e.g., the surface of the first liner 42 may be rougher than the surface of the second liner 46, wherein the smoother profile of the second liner 46 lowers the strength of the adhesion bond with the adhesive layer 44).

Figure 4:
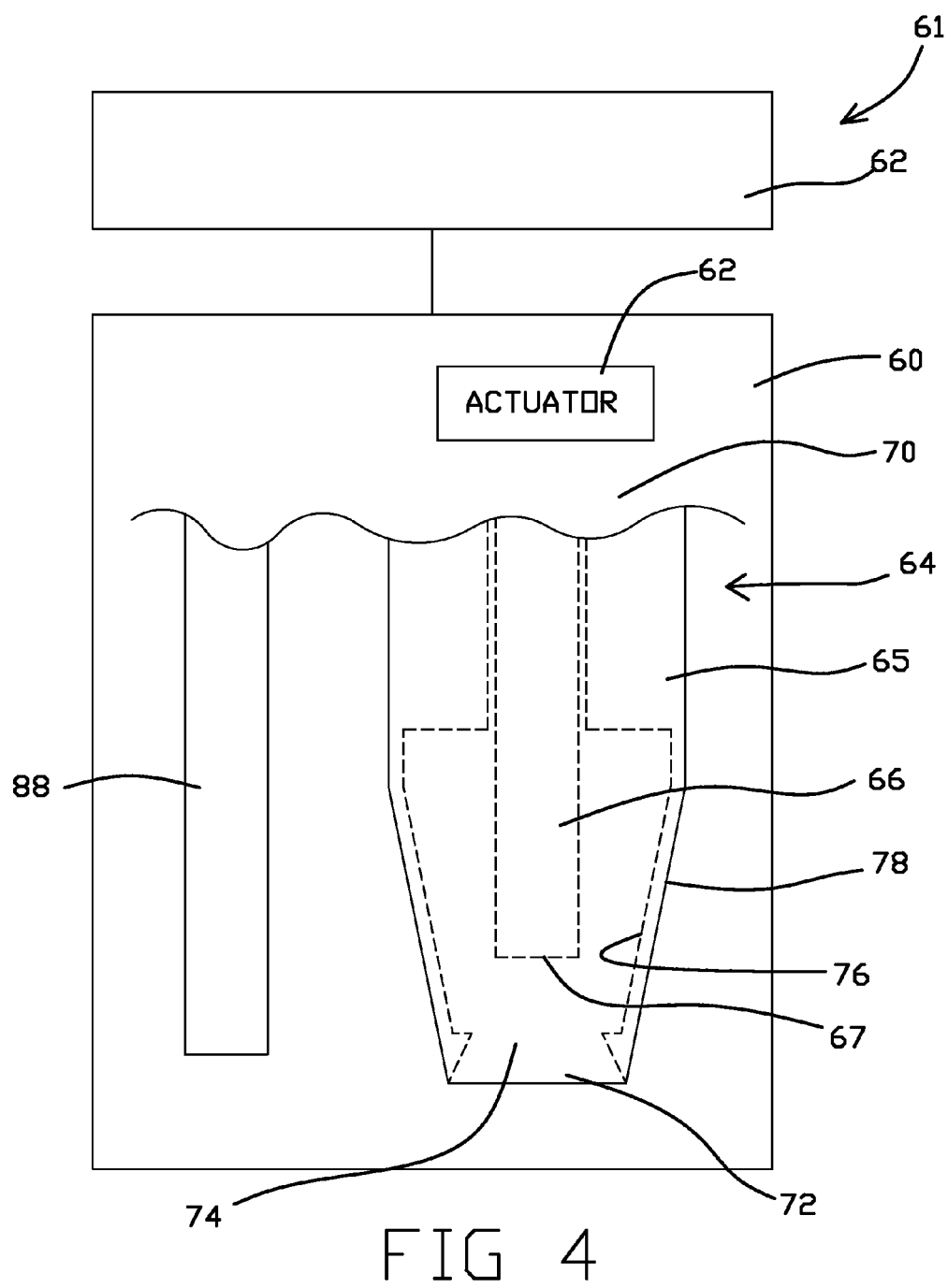
FIG. 4 is a schematic diagram showing a system including a tool attached to a gantry system according to various embodiments of the present disclosure.

FIG. 4 is a schematic diagram showing a system 61 including a tool 60 attached to a gantry system 62 according to various embodiments of the present disclosure. A gantry system 62 can control the position of the tool 60. An example of a gantry system is described in U.S. Publication No. 2005/0045914, which is hereby incorporated by reference in its entirety for all purposes. In various embodiments, a suitable gantry system 62 has a precise Z-axis gantry. In various embodiments, the gantry system 62 is configured to perform a 2-step operation including a kiss-cut step and a place step. As recited herein, distal refers to a first direction generally away from the gantry system 62 (e.g., the tool 60 in particular) and proximal refers to a second direction generally toward the gantry system (e.g., along the Z-axis).

The gantry system 62 can include an XYZ gantry allowing the gantry system 62 to control the position of the tool 60 along the X-, Y-, and Z-axes. The gantry system 62 can position the tool 60 in a first relative position in an X-Y plane near the layered adhesive strip 40. The gantry system 62 can position the tool 60 in a second relative position in the X-Y plane near a component of a hard disk drive suspension 10. The gantry system 62 can position the tool 60 in a third relative position in the X-Y plane near a receptacle. To achieve the relative positions, the gantry system 62 can translate the tool 60, layered adhesive strip 40, and/or the hard disk drive suspension 10. The gantry system 62 can utilize the Z-axis for controlling the cutting motion of the tool 60 and placing adhesive piece 30 on the surface of the component of the hard disk drive suspension 10. The Z-axis control is configured to have the required precision to cut through one layer or multiple layers of the layered adhesive strip 40 without partially or completely cutting through an adjacent layer. In various embodiments, the gantry system 62 can cause the tool 60 to cut through an adhesive layer 44 without cutting through the entire thickness of the second liner 46.

The cutting depth along the Z-axis may be precisely controlled with a hard stop 88, included in the tool 60 or the gantry system 62 (not shown), which functions as a depth-marker to control the precise cutting depth of the tool 60. The hard stop 88 can be generally immoveable in relation to the punch 64 in the Z-axis. The hard stop 88 can prevent the tool 60 from moving in one direction on the Z-axis by engaging a generally immoveable object or surface. The hard stop 88 may be set to allow the tool 60 to cut through an adhesive layer 44. The hard stop 88 may be set to prevent the tool 60 from cutting through the entire thickness of the second liner 46.

The tool 60 comprises a punch 64, a pressure pin 66, and an actuator 68 in the illustrated embodiment. The punch 64 has a proximal end 70, a distal end or tip 72, a barrel 65, and a lumen 74 extending through the barrel. In various embodiments, the barrel 65 is generally cylindrical. The barrel 65 has an inner surface 76 defining the lumen 74 and an outer surface 78. A retention feature 80 is formed in the inner surface 76 of the barrel 65 at or near the distal tip 72. The retention feature 80 can be configured to exert a friction force, causing frictional interference with an object in the lumen 74 of the punch 64, thereby retaining the object within the lumen. The retention feature 80 can be configured to exert a compression force to retain an object within the lumen 74 of the punch 64. In various embodiments, the retention feature 80 is annularly shaped in the X-Y plane.

The pressure pin 66 is disposed within the lumen 74. The pressure pin 66 is radially sized to move through the lumen 74, which may include the region bounded by the retention feature 80 of the inner surface 76 at the distal tip 72. A distal face 67 of the pressure pin 66 is substantially flat so that the pressure pin 66 can engage a liner of the layered adhesive strip 40 and apply a generally even force thereto. The actuator 68 is disposed in the proximal end 70 of the tool 60 and is configured to translate the pressure pin 66. The actuator 68 is capable of exerting a force upon the pressure pin 66 to translate the pin generally along the Z-axis. In other words, the actuator 68 can extend or retract the pressure pin 66 to select positions.

Figure 5:
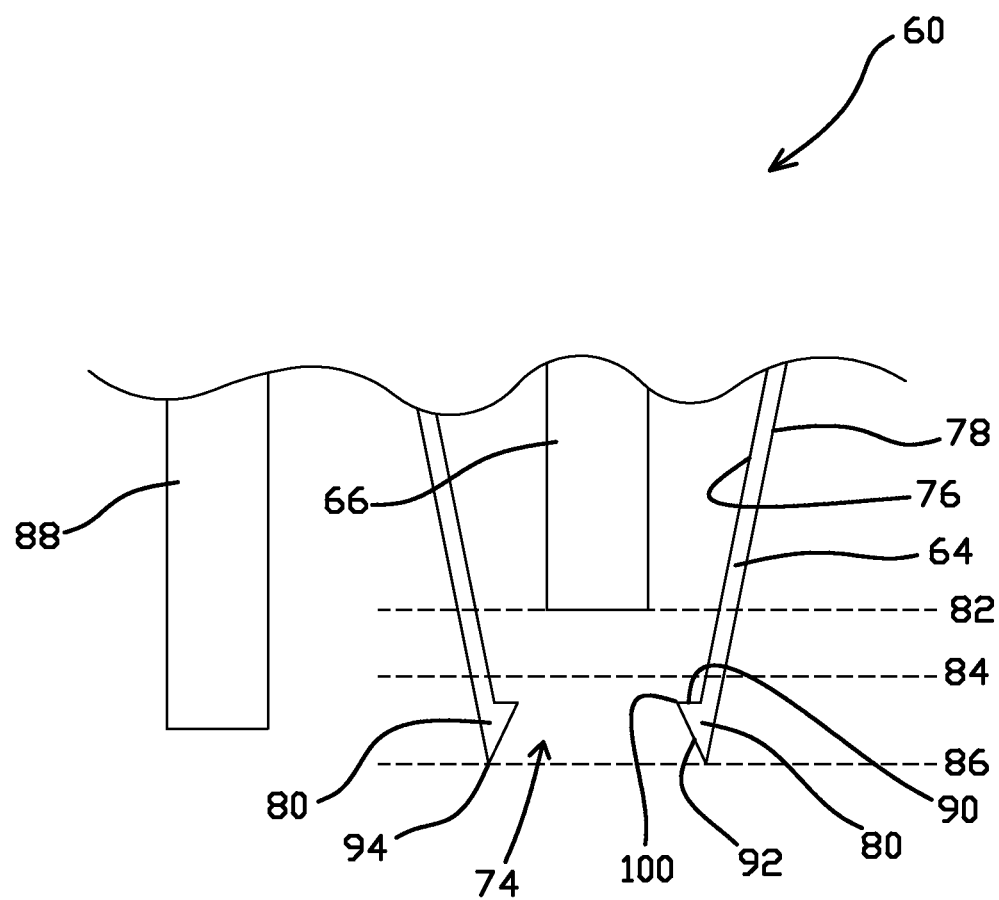
FIG. 5 is a detailed cross-sectional side view of the distal end of an exemplary tool 60.

FIG. 5 is a detailed cross-sectional side view of the distal end of an exemplary tool 60. The barrel 65 near the distal tip 72 forms a cutting edge 94 of the punch 64. The cutting edge 94 is sharp. The cutting edge 94 is configured to cut various layers of a layered adhesive strip 40, for example, as shown in FIG. 3. In various embodiments, the outer surface 78 tapers to the cutting edge 94 at or near the distal tip 72.

The retention feature 80 can have a proximal surface 90 and a distal surface 92, which meet at an angle that forms an inner edge 100. The inner edge 100 can be sharp giving the retention feature 80 a barb shape. In various embodiments, the inner edge 100 is continuous and/or annularly shaped in the X-Y plane. The barb shape is configured to readily allow an object (e.g., a first liner 42) to traverse proximally along the barb shape but to resist movement of the object distally along the barb shape. In various embodiments, the angle between the surfaces 90, 92 is less than 90 degrees. The distal surface 92 tapers to meet the outer surface 78 at an edge opposite the inner edge 100 forming the profile of the cutting edge 94 at the distal tip 72. In various embodiments, the angle between the distal surface 92 and the outer surface 78 is less than 90 degrees, giving sharpness to the cutting edge 94.

In some embodiments, the retention feature 80 can be a ring that projects inwardly around the entirety of an inner circumference of the lumen 74. In this way, the inner edge 100 can be a ridge within the lumen 74. In some other embodiments, the retention feature 80 comprises a plurality of separate protrusion elements that each project inwardly at discrete locations around the inner circumference of the lumen 74. The projection elements can be evenly spaced around the inner circumference of the lumen 74. For example, a set of two protrusion elements can be located 180 degrees from each other, a set of three protrusion elements can be located 120 degrees from each other, a set of four protrusion elements can be located 90 degrees from each other, etc. In some embodiments, the protrusion elements are located at the same longitudinal position of the barrel 65 (e.g., each has the same Z-axis location). In some other embodiments, the protrusion elements are located at different longitudinal positions of the barrel 65 (e.g., two or more protrusion elements have different Z-axis locations).

The cutting edge 94 has a profile in the X-Y plane. The profile can be an annular profile, such as a circle shape or an ellipse shape. In the illustrated embodiment, the cutting edge 94 is substantially symmetric about an axis parallel to the Z-axis. The cutting edge 94 is configured to form the shape of the adhesive piece 30 upon cutting. For example, if the cutting edge 94 has a circular profile, then it will cut the adhesive piece 30 into a circular shape. In various embodiments, the diameter of adhesive piece 30 having the circular profile is 12/1000 of an inch. The punch 64 can be formed of any suitable material to establish a cutting edge, such as aluminum or steel. The features of the punch 64 can be formed by CNC machining, etching, or other suitable methods for forming said suitable material.

The distal face 67 of the pressure pin 66 can be translated by the actuator 68 into a first position 82, a second position 84 proximal the first position 82, and a third position 86 proximal the second position 84 along a Z-axis. In the first position 82, the distal face 67 of the pressure pin 66 is substantially in the X-Y plane defined by first position 82, which is proximal to the inner edge 100. In the second position 84, the distal face 67 of the pressure pin 66 is substantially in the X-Y plane defined by second position 84, which is proximal the inner edge 100. In the third position 86, the distal face 67 of the pressure pin 66 is substantially in the X-Y plane defined by third position 86, which is distal to the inner edge 100. In the first position 82, the pressure pin 66 leaves a space between its distal face 67 and the distal tip 72 in the lumen 74. In the second position 84, the pressure pin 66 leaves less space in distal tip 72 in the lumen 74 relative to the first position 82. In the third position 86, the pressure pin 66 leaves even less space in the distal tip 72 in the lumen 74 relative to the second position 84. The actuator 68 can be configured as, for example, a hard stop actuator, an encoder motor, or a fluid or air pressure actuator, capable of translating the pressure pin 66 into each position from another position.

Figure 15:
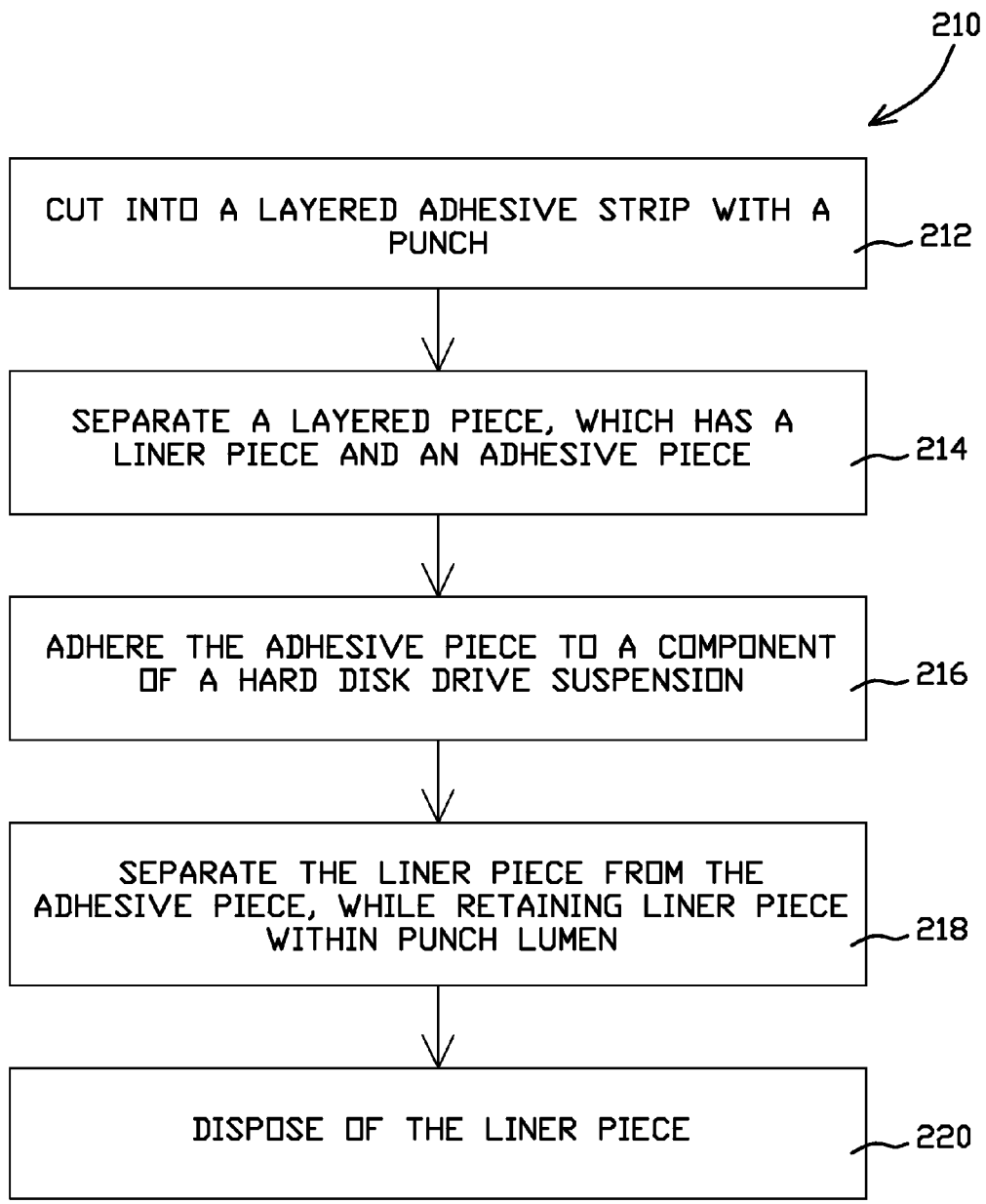
FIG. 15 is a flow chart showing an overview of an exemplary method, according to various embodiments of the present disclosure.

FIGS. 6-12 are side facing cross sectional views showing exemplary tool 60 at various points in time during use (e.g., corresponding to the method steps of FIG. 15). FIG. 6 is a side facing cross sectional view showing the tool 60 in a pre-cut position 110. In pre-cut position 110, the tool 60 is positioned in the X-Y plane at a first relative position, as previously described, proximal to a layered adhesive strip 40. The tool 60 hovers proximal to the layered adhesive strip 40 leaving a space between the distal tip 72 of the punch 64 and the layered adhesive strip 40. The portion of the layered adhesive strip 40 over which the tool 60 hovers has a first liner 42, adhesive layer 44, and a second liner 46. As shown in FIG. 6, the pressure pin 66 is retracted within the lumen 74 of the punch 64 and the distal face 67 of the pressure pin 66 is in a first position 82.

FIG. 7 is a side facing cross sectional view showing the tool 60 in the post-cut position 112 (e.g., following the state shown in FIG. 6). In post-cut position 112, the tool 60 is in a position distal to pre-cut position 110. The gantry system 62 causes relative movement of the tool 60 from the pre-cut position 110 to the post-cut position 112. The gantry system 62 also causes the punch 64 to move downward, along the Z-axis, to cut into a layered adhesive strip 40 having a first liner 42, adhesive layer 44, and second liner 46. The cutting edge 94 of the punch 64 passes completely through the first liner 42 and the adhesive layer 44. A layered piece 96 is at least partially separated from the layered adhesive strip 40 but the cutting. The layered piece 96 includes a liner piece 98 and an adhesive piece 30 formed from the first liner 42 and adhesive layer 44, respectively. The layered piece 96 is forced into the lumen 74 of the punch 64 during the cutting. The cutting edge 94 may extend partially into the second liner 46 to ensure a full cut through the adhesive layer 44. The cutting edge 94 is halted from cutting completely through the second liner 46 by the functioning of the hard stop 88 (shown in FIGS. 4 and 5). For example, the hard stop 88 can be fixed in position relative to the punch 64 and can engage a surface, such as a platform or post, to prevent no more downward movement of the cutting edge 94 than intended. The distal face 67 of the pressure pin 66 remains retracted in first position 82 during the cutting. The lumen 74 is shown as having received the first liner 42 in the interior space of the lumen 74.

The retention feature 80 is inwardly bound by a proximal surface 90 and a distal surface 92. The retention feature 80 engages the first liner 42 during cutting of the first liner 42 and the adhesive layer 44. The retention feature 80 provides a retention force upon the first liner 42. The retention force can include a friction force upon the first liner 42, causing frictional interference, which may be sufficient to retain the first liner 42 within the lumen 74 during various subsequent steps.

The retention force of the frictional interference can be enhanced by a compression force. In the illustrated embodiment, the inner edge 100 of the retention feature 80 extends radially inward into the first liner 42. The inner diameter of the lumen 74 narrows along the distal surface 92 from the distal most tip of the cutting edge 94 to the inner edge 100. In other words, the lumen 74 has a first inner diameter at a first location and a second inner diameter at a second location, wherein the first inner diameter is larger than the second inner diameter and the first location is distal of the second location. The first liner 42 is compressed by the narrowing of the lumen 74 as the first liner 42 moves proximally along the distal surface 92 into the lumen 74 during the downward cutting stroke of the punch 64. The compression of the first liner 42 increases frictional interference between the lateral sides of the first liner 42 and the distal surface 92.

The retention force can be provided by the barb-like shape of the retention feature 80. The first liner 42 has sufficient thickness (as measured along the Z-axis) such that a proximal portion of the first liner 42 extends proximal of the retention feature 80 (e.g., the inner edge 100 specifically) and a distal portion of the first liner 42 extends distal of the retention feature 80 after cutting. As shown, a width of the portion of the first liner 42 that is proximal of the inner edge 100 may be greater than a width of another portion of the first liner 42 that is distal the inner edge 100. In other words, compression of the first liner 42 by the inner edge 100 causes the barb-shaped retention feature 80 to catch the first liner 42, increasing a retention force that resists movement of the first liner 42 (and the adhesive piece 30 attached thereto) distally in the Z-axis. Whether by frictional interference and/or the action of the barb-shaped retention feature, the overall retention force exerted on the release liner 42 is greater than the adhesion forces between the liners 42, 46 and a portion of the adhesive layer 44 within the lumen 74.

FIG. 8 is a cross sectional side view showing the tool 60 in an extraction position 114. In the extraction position 114, the tool 60 is in a position proximal to post-cut position 112. The gantry system 62 causes relative movement of the tool 60 from post-cut position 112 to extraction position 114, such as by proximal movement of the tool 60 relative to the remainder of the layered adhesive strip 40. As previously discussed, the overall retention force is greater than the second adhesion force between the adhesive piece 30 and the second liner 46, and the second adhesion force is greater than the first adhesion force between the adhesive piece 30 and the liner piece 98. The relationship between the forces allows the punch 64 to retain, at least partially, the liner piece 98 adhered to the adhesive piece 30 in the lumen 74 following the cutting and during separation of the layered piece 96 from the remaining layered adhesive strip 40. In the illustrated embodiment, the distal end 72 of the punch 64 is tapered, which facilitates release of the punch 64 from the remainder of the layered adhesive strip 40 as the punch 64 is moved into the extraction position 114. The distal face 67 of the pressure pin 66 remains in first position 82.

FIG. 9 is a cross sectional side view showing the tool 60 in pre-placement position 116. In pre-placement position 116, the tool 60 is in the X-Y plane at a second relative position, as previously described, proximal to a component 102 of a hard disk drive suspension 10. The gantry system 62 causes the tool 60 to move from the first relative position in post-cut position 112 to the second relative position in pre-placement position 116. The tool 60 is poised proximal to the suspension component 102 leaving a space between the distal tip 72 of the punch 64 and the suspension component. The component 102 can be a tongue 18 or a motor 32, for example, although the component 102 could be any part of a suspension or other device. A top surface of the suspension component 102 is preferably clean and free of contaminants, such as dust, to facilitate proper adhesion to the top surface. The layered piece 96 remains retained in the lumen 74 of the punch 64 due to the retention force, as previously described. The distal face 67 of the pressure pin 66 remains in the first position 82.

Figure 10:
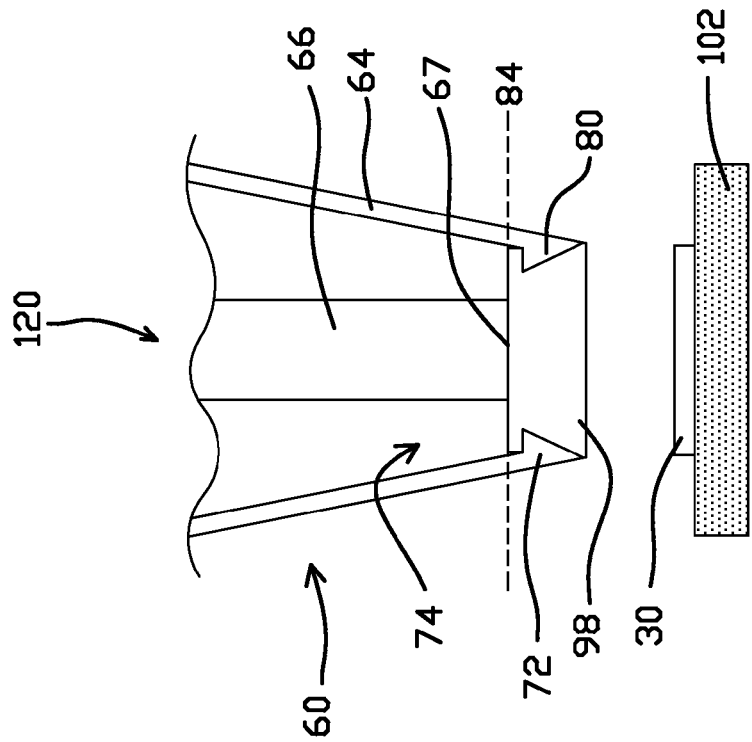
FIG. 10 is a side view showing the tool 60 in placement position.

FIG. 10 is a cross sectional side view showing the tool 60 in a placement position 118. In the placement position 118, the tool 60 is in a position distal to pre-placement position 116. The gantry system 62 causes relative movement of the tool 60 from pre-placement position 116 to placement position 118. Specifically, the gantry system 62 lowers the tool 60 in a distal movement. When the distal face 67 of the pressure pin 66 is translated by the actuator 68 from first position 82 to second position 84, the distal face 67 engages a top surface of the liner piece 98, advancing the whole layered piece 96 distally. The adhesive piece 30, while still adhered to a bottom surface of the liner piece 98, engages the top surface of the suspension component 102. The pressure pin 66 can be advanced (distally) or at least held in position relative to the punch 64 during and/or after the lowering of the tool 60 from the pre-placement position 116 to the placement position 118. The advancement of the pressure pin 66 relative to the punch 64 and/or the lowering of the tool 60 applies pressure to the top side of the liner piece 98 which in turn applies pressure to the adhesive piece 30 to bond the bottom surface of the adhesive piece 30 to the top surface of the suspension component 102. The distal tip 72 of the punch 64 remains proximal to the suspension component 102.

The adhesion force created between the adhesive piece 30 and the suspension component 102 is greater than the adhesion force between the liner piece 98 and adhesive piece 30. The liner piece 98 has a sufficient thickness such that, when the distal face 67 of the pressure pin 66 is translated to the second position 84, a portion of the liner piece 98 remains proximal to the retention feature 80. The retention force due to the retention feature 80, as previously described, is greater than either the adhesion force between the adhesive piece 30 and the suspension component 102 or the adhesion force between the liner piece 98 and adhesive piece 30.

Figure 11:
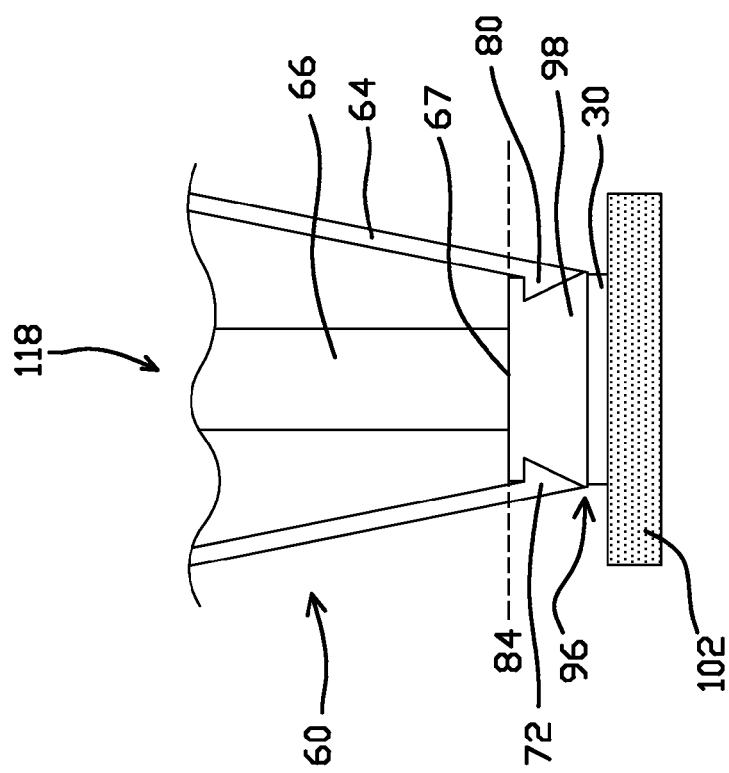
FIG. 11 is a side view showing the tool 60 in release position.

FIG. 11 is a cross sectional side view showing the tool 60 in a release position 120. In the release position 120, the tool 60 is in a position proximal to placement position 118. The gantry system 62 causes relative movement of the tool 60 from the placement position 118 to the release position 120. When the punch 64 moves proximally along the Z-axis, the relationship of forces described above with respect to FIG. 10 causes the liner piece 98 to separate or release from the adhesive piece 30. The adhesive piece 30 remains adhered to the component 102. The liner piece 98 remains in the lumen 74 of the punch 64 at the distal tip 72 due to the previously described retention force caused by the retention feature 80. The pressure pin 66 can remain in the second position 84. Alternatively, the pressure pin 66 can be retracted to first position 82.

FIG. 12 is a cross sectional side view showing the tool 60 in a pre-disposal position 122. In the pre-disposal position 122, the tool 60 is in the X-Y plane at a third relative position, as previously described, proximate to a receptacle 104 (e.g., a vacuum bucket). The gantry system 62 causes the tool 60 to move from the second relative position in release position 120 to the third relative position in pre-disposal position 122. The tool 60 hovers proximal to the receptacle 104 near an opening 106 of the receptacle 104. The distal face 67 of the pressure pin 66 remains in a position other than the third position 86, such as the second position 84 or a position with the distal face 67 proximal of the third position 86. The liner piece 98 is retained in the lumen 74 of the punch 64 at the distal tip 72 by the retention force due to the retention feature 80, as previously described.

FIG. 13 is a cross sectional side view showing the tool 60 in a disposal position 124. In the disposal position 124, the punch 64 is in the same position as in the pre-disposal position 122. When the distal face 67 of the pressure pin 66 is translated by the actuator 68 from the second position 84 to the third position 86, the distal face 67 engages a top surface of the liner piece 98, advancing the liner piece distally. As previously described, the distal face 67 in the third position 86 is distal to the inner edge 100, and the inner edge 100 no longer engages the liner piece 98, causing a substantial reduction in retention force due to the retention feature 80. The receptacle 104 can also provide a vacuum force through the opening 106 that urges the liner piece 98 to move distally. Whether by the reduced retention force and/or the vacuum force, the retention force is no longer sufficient to retain the liner piece 98 and the liner piece 98 is expelled or ejected from the lumen 74 of the punch 64 at the distal end 72. The liner piece 98 preferably enters the opening 106 and is disposed within the receptacle 104. Disposal of the liner piece 98 prevents it from disrupting or contaminating nearby manufacturing processes.

Figure 14:
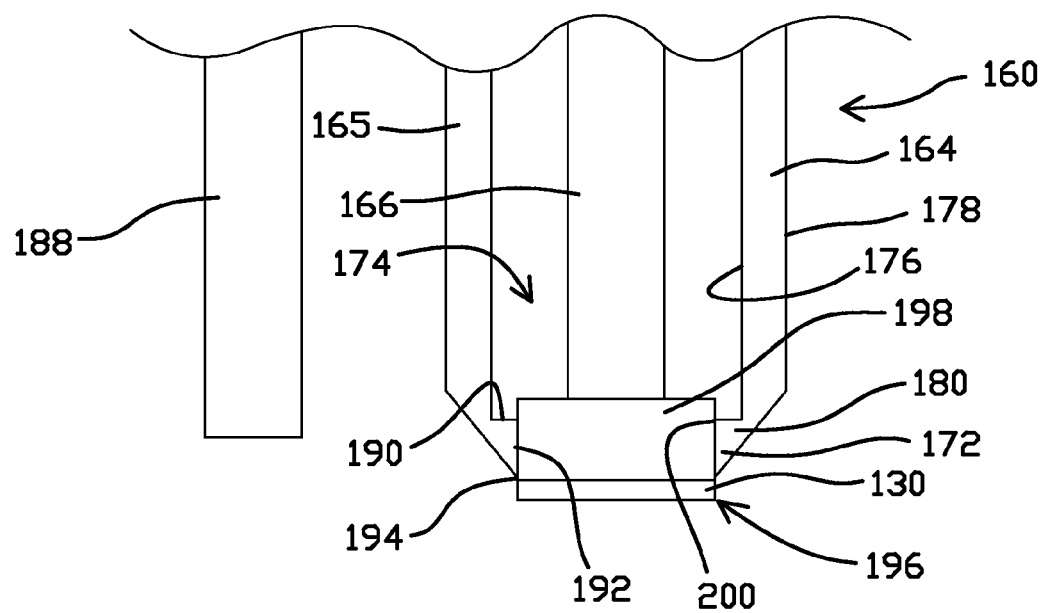
FIG. 14 is side view showing the end of a tool 160 in accordance with alternative embodiments of this disclosure.

FIG. 14 is a cross sectional side view showing the end of a tool 160 in accordance with various embodiments of this disclosure. Tool 160 is similar to tool 60 in structure and function and thus is similarly numbered to FIG. 5 for similar features (e.g. pressure pin 166 is similar to pressure pin 66), except where noted. In the illustrated embodiment, the tool 160 includes a punch 164, a pressure pin 166, and an actuator (not shown). The punch 164 includes a distal tip 172, a barrel 165, and a lumen 174 extending through the barrel. The barrel 65 has an inner surface 176 defining the lumen 174 and an outer surface 178. A retention feature 180 is formed in the inner surface 176 of the barrel 165 at or near the distal tip 172. The retention feature 180 has a proximal surface 190 and a distal surface 192.

Different from the embodiment shown in FIG. 5, the distal surface 192 of the retention feature 180 does not taper. Instead, the distal surface 192 is generally parallel to a Z-axis and meets at an approximately 90 degree angle with the proximal surface 190 forming an inner edge 200 and giving the retention feature 180 a barb shape. The outer surface 178 near the distal tip 172 tapers to meet the distal surface 192 to form the cutting edge 194. The retention feature 180 is configured to exert a similar retention force to that described above upon a layered piece 196, which includes a liner piece 198 and an adhesive piece 130.

FIG. 15 is a flow chart showing an overview of an exemplary method 210 for placing an adhesive piece extracted from a layered adhesive strip onto a component of hard disk drive suspension using tool, according to various embodiments of the present disclosure. The method 210 can employ the apparatuses discussed herein (e.g., the embodiments of FIGS. 4-14 or other embodiments). In step 212, a punch of the tool cuts into a layered adhesive strip. The punch cuts at least a first liner and an adhesive layer forming a layered piece including a liner piece remaining adhered to an adhesive piece. The tool includes a pressure pin placed in a first position and an actuator for controlling translation of the pin. In step 214, the layered piece is separated from the remainder of the layered adhesive strip, and is retained in the punch, as the punch moves away from the layered adhesive strip. The tool is moved toward a component of a hard disk drive suspension. In step 216, the adhesive piece is adhered to the component of the hard disk drive suspension by providing a first force onto the adhesive piece through the adhered liner piece. Such force can be provided by the actuator through the pressure pin being translated from a first position to a second position. In step 218, a liner piece is separated from the adhesive piece, which remains adhered to the suspension component, while the liner piece is retained in a lumen of the punch. In step 220, the liner piece is disposed. The liner piece can be expelled from the lumen of the punch by translating the pressure pin from a second position to a third position, which provides a second force onto the liner piece. The expelled liner piece may also be collected by a receptacle, such as a vacuum bucket.

Although the present invention has been described with reference to preferred embodiments, those skilled in the art will recognize that changes can be made in form and detail without departing from the spirit and scope of the invention. For example, the various features of the illustrated embodiments can be combined with features of other embodiments. As such, the various embodiments disclosed herein can be modified in view of the features of other embodiments, such as by omitting and/or adding features.

The following is claimed:

1. A method for dispensing an adhesive piece onto a component of a hard disk drive suspension, the method comprising:

providing a layered adhesive strip having an adhesive layer, the adhesive layer having a first side and a second side opposite the first side, the layered adhesive strip further comprising a first liner on the first side and a second liner on the second side, wherein a first adhesion force between the first liner and the adhesive layer is greater than a second adhesion force between the adhesive layer and the second liner;

cutting into the layered adhesive strip with a punch, the punch having a cutting edge and a lumen, the cutting edge passing through the first liner and the adhesive layer to form a liner piece and an adhesive piece;

separating the adhesive piece from the second liner, wherein the liner piece is retained at least partially in the lumen of the punch by a retention feature within the lumen and the adhesive piece remains adhered to the liner piece;

adhering the adhesive piece to the component of the hard disk drive suspension; and separating the adhesive piece from the liner piece while the adhesive piece remains adhered to the component of the hard disk drive suspension and the liner piece is retained in the lumen by the retention feature.

2. The method of claim 1, wherein the adhesive piece is adhered to the component of the hard disk drive suspension by translating a pressure pin within the lumen from a first position to a second position.

3. The method of claim 2, further comprising expelling the liner piece from the lumen of the punch by translating the pressure pin within the lumen from the second position to a third position.

4. The method of claim 3, further comprising disposing of the expelled liner piece in a receptacle having an opening.

5. The method of claim 1, wherein the retention feature within the lumen engages the liner piece to create a retention force greater than the adhesion force between the adhesive piece and the second liner.

6. The method of claim 1, wherein frictional interference between an inner surface of the lumen and the liner piece creates a retention force greater than the adhesion force between the adhesive piece and the second liner.

7. The method of claim 6, wherein the lumen narrows between a distal location and a proximal location such that, after the cutting step and before the separating the adhesive piece from the liner piece step, the liner piece is compressed within the lumen to increase the frictional engagement between the inner surface of the lumen and the liner piece.

8. The method of claim 1, wherein cutting comprises lowering the punch along a Z-axis, separating the adhesive piece from the second liner comprising raising the punch along the Z-axis, adhering the adhesive piece to the component comprises lowering the punch, and separating the adhesive piece from the liner piece comprises raising the punch along the Z-axis.

9. The method of claim 1, further comprising positioning the punch in a first location along an X-Y plane for the cutting and separating from the second liner steps, and positioning the punch in a second location along the X-Y plane for the adhering and the separating the adhesive piece from the liner piece steps.

10. A system for dispensing an adhesive piece onto a component of a hard disk drive suspension, the system comprising:

a punch comprising a barrel, a lumen, and a distal cutting edge, and a retention feature disposed within the lumen;

a gantry system configured to translate the punch along a Z-axis between an upper position and a lower position;

a pressure pin translatable within the lumen; and an actuator configured to translate the pressure pin within the lumen between a first position, a second position, and a third position relative to the punch, wherein the cutting edge is configured to cut a liner piece and an adhesive piece from a layered adhesive strip when the gantry system translates the punch from the upper position to the lower position, the first position of the pressure pin allows the release liner to enter the lumen during the cutting of the liner piece from the layered adhesive strip, the retention feature is configured to retain the liner piece within the lumen while the adhesive piece is attached to the liner piece following the cutting of the liner piece from the layered adhesive strip, translation of the pressure pin from the first position to the second position applies the adhesive piece to the component of the hard disk drive suspension, and translation of the pressure pin from the second position to the third position expels the liner piece from the lumen.

11. The system of claim 10, further comprising a receptacle having an opening for receiving the expelled liner piece.

12. The system of claim 10, wherein the retention feature is configured to cause frictional interference between an inner surface of the barrel and a liner piece creating a retention force greater than an adhesion force between the adhesive piece and a second liner of the layered adhesive strip.

13. The system of claim 11, wherein the gantry system is further configured to translate the punch from the lower position to the upper position to separate the adhesive layer from the second liner.

14. The system of claim 10, wherein the retention feature is configured to retain the liner piece within the lumen while the gantry system translates the punch from the lower position to the upper position after the adhesive piece has been applied to the component of the hard disk drive suspension.

15. The method of claim 10, wherein the gantry system is configured to position the punch in a first location along an X-Y plane when cutting the liner piece and the adhesive piece from the layered adhesive strip, and the gantry system is configured to position the punch in a second location along the X-Y plane when applying the adhesive piece to the component of the hard disk drive suspension.

16. The system of claim 10, wherein the lumen narrows between a distal location and a proximal location to compress the liner piece within the lumen to increase the frictional engagement between the inner surface of the lumen and the liner piece.

17. The system of claim 10, wherein the retention feature comprises a barb.

18. The system of claim 10, wherein the retention feature is formed from the inner surface of the lumen.

19. A method for dispensing an adhesive piece onto a component of a hard disk drive suspension, the method comprising:

cutting into a layered adhesive strip by moving a punch downward, the punch having a cutting edge and a lumen, the cutting edge passing through a first liner and an adhesive layer to form a liner piece and an adhesive piece;

separating the adhesive piece from a second liner of the layered adhesive strip by moving the punch upward, wherein the liner piece is retained at least partially in the lumen of the punch by a retention feature within the lumen and the adhesive piece remains adhered to the liner piece;

adhering the adhesive piece to the component of the hard disk drive suspension by moving the punch downward; and separating the adhesive piece from the liner piece by moving the punch upward, wherein the adhesive piece remains adhered to the component of the hard disk drive suspension and the liner piece is retained in the lumen by the retention feature after the adhesive piece is separated from the liner piece; and expelling the liner piece from the lumen of the punch.

20. The method of claim 19, wherein:

adhering the adhesive piece to the component of the hard disk drive suspension further comprises moving a pressure pin within the lumen of the punch from a first position to a second position, the second position distal of the first position, the pressure pin engaged with the liner piece, and expelling the liner piece from the lumen of the punch further comprises moving the pressure pin within the lumen from the second position to a third position, the third position distal of the second position.

\* \* \* \* \*